US006879912B2

United States Patent
Chen et al.

(10) Patent No.: US 6,879,912 B2
(45) Date of Patent: Apr. 12, 2005

(54) SIMPLE NAVIGATION SYSTEM AND METHOD

(75) Inventors: Kuo-Rong Chen, Panchiao (TW); Chun-Chung Lee, Taipei (TW); Cheng-Hung Huang, Miaoli (TW)

(73) Assignee: Sin Etke Technology Co., Ltd., Taipei (TW)

( * ) Notice: Subject to any disclaimer, the term of this patent is extended or adjusted under 35 U.S.C. 154(b) by 0 days.

(21) Appl. No.: 10/455,386

(22) Filed: Jun. 6, 2003

(65) Prior Publication Data

US 2004/0167711 A1 Aug. 26, 2004

(30) Foreign Application Priority Data

Feb. 21, 2003 (TW) ........................................ 92103705 A

(51) Int. Cl.[7] ............................ G01C 21/00; G06G 7/78
(52) U.S. Cl. ....................... 701/209; 701/208; 701/210; 701/202
(58) Field of Search ................................ 701/209, 208, 701/212, 210, 224, 202

(56) References Cited

U.S. PATENT DOCUMENTS

| | | | | |
|---|---|---|---|---|
| 4,796,189 A | * | 1/1989 | Nakayama et al. | ......... 701/209 |
| 4,962,458 A | * | 10/1990 | Verstraete | .................... 701/200 |
| 5,353,034 A | * | 10/1994 | Sato et al. | ................... 342/457 |
| 5,486,822 A | * | 1/1996 | Tenmoku et al. | ....... 340/995.22 |
| 5,845,228 A | * | 12/1998 | Uekawa et al. | ............. 701/209 |
| 6,009,403 A | * | 12/1999 | Sato | ................................ 705/6 |
| 6,014,607 A | * | 1/2000 | Yagyu et al. | ................ 701/202 |
| 6,281,807 B1 | * | 8/2001 | Kynast et al. | .............. 340/905 |
| 6,532,417 B2 | * | 3/2003 | Hatano | ........................ 701/207 |

* cited by examiner

Primary Examiner—Thomas G. Black
Assistant Examiner—Brian J. Broadhead
(74) Attorney, Agent, or Firm—Bacon & Thomas, PLLC

(57) ABSTRACT

A simple navigation system is disclosed in which a remote customer service center calculates an optimal route and selects a geo area covering all traveling routes of the optimal route. The geo area is defined by two boundary points, and equally divided by a pair of 2D grid number into multiple geo zones each defined with a respective pair of 2D index. The remote customer service center sends the two boundary points, the pair of 2D grid number, and multiple pairs of 2D indexes of traveling zones arranged orderly from a starting point to a destination to a car wirelessly. The car reconstructs a 2D grillwork with two boundary points, divides the 2D grillwork subject to the 2D grid number, defines each grid a pair of 2D index, and fines a guiding direction by comparing the pairs of 2D indexes of the current grid and the next traveling grid.

20 Claims, 10 Drawing Sheets

FIG. 4

A grid labeled A with cells $A_{ij}$ where $i$ ranges from $0$ to $m$ and $j$ ranges from $0$ to $n$. Corner points are $P_{e1}(X_{e1}, Y_{e1})$ at $i=0, j=0$ and $P_{e2}(X_{e2}, Y_{e2})$ at the opposite corner.

Cells (by row, from $i=0$ at bottom to $i=m$ at top):

Row C: $A_{C9}, A_{C8}, A_{C7}, A_{C6}, A_{C5}, A_{C4}, A_{C3}, A_{C2}, A_{C1}, A_{C0}$
Row B: $A_{B9}, A_{B8}, A_{B7}, A_{B6}, A_{B5}, A_{B4}, A_{B3}, A_{B2}, A_{B1}, A_{B0}$
Row A: $A_{A9}, A_{A8}, A_{A7}, A_{A6}, A_{A5}, A_{A4}, A_{A3}, A_{A2}, A_{A1}, A_{A0}$
Row 9: $A_{99}, A_{98}, A_{97}, A_{96}, A_{95}, A_{94}, A_{93}, A_{92}, A_{91}, A_{90}$
Row 8: $A_{89}, A_{87}, A_{87}, A_{86}, A_{85}, A_{84}, A_{83}, A_{82}, A_{81}, A_{80}$
Row 7: $A_{79}, A_{78}, A_{77}, A_{76}, A_{75}, A_{74}, A_{73}, A_{72}, A_{71}, A_{70}$
Row 6: $A_{69}, A_{68}, A_{67}, A_{66}, A_{65}, A_{64}, A_{63}, A_{62}, A_{61}, A_{60}$
Row 5: $A_{59}, A_{58}, A_{57}, A_{56}, A_{55}, A_{54}, A_{53}, A_{52}, A_{51}, A_{50}$
Row 4: $A_{49}, A_{48}, A_{47}, A_{46}, A_{45}, A_{44}, A_{42}, A_{42}, A_{41}, A_{40}$
Row 3: $A_{39}, A_{38}, A_{37}, A_{36}, A_{35}, A_{34}, A_{33}, A_{32}, A_{31}, A_{30}$
Row 2: $A_{29}, A_{28}, A_{27}, A_{26}, A_{25}, A_{24}, A_{23}, A_{22}, A_{21}, A_{20}$
Row 1: $A_{19}, A_{18}, A_{17}, A_{16}, A_{15}, A_{14}, A_{13}, A_{12}, A_{11}, A_{10}$
Row 0: $A_{09}, A_{08}, A_{07}, A_{06}, A_{05}, A_{04}, A_{03}, A_{02}, A_{01}, A_{00}$

SIMPLE NAVIGATION SYSTEM AND METHOD

BACKGROUND OF THE INVENTION

1. Field of the Invention

The present invention relates to automobile navigation technology and, more particularly, to a simple navigation system and method that guides the traveling direction of an automobile to the destination.

2. Description of Related Art

Conventional motor vehicle navigation systems are to provide each motor vehicle with an electronic map database and an On-Board Unit, enabling the On-Board Unit of each motor vehicle to calculate the optimal route to the destination itself. Because each motor vehicle must be equipped with a huge electronic map database and an expensive On-Board Unit, the cost is high and, much vehicle installation space is required.

U.S. Pat. Nos. 6,292,743 and 6,314,369 disclose a navigation technology, which uses a remote server to calculate the optimal route for a vehicle and sends the optimal route to the motor vehicle's On-Board Unit by radio. The optimal route to be sent to the motor vehicle's On-Board Unit according to these conventional methods include the geographical longitude/latitude (or even altitude) coordinates of the optimal route. Because the conventional geographical longitude/latitude (or even altitude) coordinates must be further calculated through a complicated degree, minute, second converting procedure in the remote server before sending to the motor vehicle's On-Board Unit wirelessly, the amount of wireless transmitting data is huge, resulting in high error rate. Further, upon receipt of the converted optimal route, the motor vehicle's On-Board Unit must convert its current GPS data into degree, minute, and second data so as to compare with the above converted data of the optimal route. The converting procedure in the On-Board Unit is complicated and time-consuming. Further, in order to achieve the aforesaid complicated converting procedure, the On-Board Unit must is sophisticated and expensive.

Therefore, it is desirable to provide an automobile navigation system that eliminates the aforesaid drawbacks.

SUMMARY OF THE INVENTION

It is the main object of the present invention to provide a simple navigation system and method, which improves the navigation calculation efficiency and simplifies the structure of the On-Board Unit. It is another object of the present invention to provide a simple navigation system and method, which minimizes wireless data transmitting amount and improves wireless data transmitting accuracy.

According to one aspect of the present invention, the simple navigation method is used in a customer service center, comprising the steps in series of:

(A) receiving the position information of a starting point and the position information of a destination point;

(B) searching at least one traveling route proceeding from the starting point to the destination point;

(C) selecting a geo area covering the at least one traveling route, in which the geo area is defined by at least two position parameters and equally divided into a plurality of geo zones subject to a pair of predetermined 2D (two-dimensional) grid number, the geo zones being respectively defined with a respective pair of 2D (two-dimensional) index subject to a 2D (two-dimensional) array rule;

(D) searching multiple traveling zones corresponding to the geo zones including the at least one traveling route therein; and (E) establishing a simple navigation information, the simple navigation information comprising the at least two position parameters, the pair of 2D grid number, and the pairs of 2D indexes of the traveling zones being arranged in order.

According to another aspect of the present invention, the simple navigation system is installed in a motor vehicle, comprising a GPS (global positioning system) module, memory means, processor means, and output means. The aforesaid simple navigation information is pre-stored in the memory means. The processor means read at least two position parameters from the memory means, defines a virtual 2D (two-dimensional) grillwork by means of the at least two position parameters, reads the pair of 2D grid number from the memory means and equally divides the 2D grillwork into a plurality of 2D (two-dimensional) grids each having a respective reference point position and a respective pair of 2D index defined subject to a 2D array rule, fetches the information of the current position of the motor vehicle from the GPS module, compares the information of the current position of the motor vehicle to the reference point positions of the 2D grids so as to calculate the pair of 2D index of a current grid corresponding to the current position of the motor vehicle, and produces a guidance information by comparing the pair of 2D index of the current grid of the current position of the motor vehicle to the pairs of 2D indexes of the traveling grids stored in the memory means arranged in order from a starting point to a destination point. The guidance information is then outputted through the output means for guiding the motor vehicle to the destination.

The processor means of the On-Board Unit of the motor vehicle simply compares the pair of 2D index of the current grid and the pairs of 2D indexes of the orderly arranged traveling grids. Due to simple comparative data form and easy calculating procedure, the navigation operation efficiency in the On-Board Unit is greatly improved. Further, because it is not necessary to convert and compare complicated longitude/latitude coordinates data, a simple microprocessor can be used for the processor means of the On-Board Unit. Because the customer service center only needs to simply transmit the pairs of 2D indexes of the traveling zones to the motor vehicle wirelessly without transmitting complicated longitude/latitude coordinate data, the wireless data transmission amount is reduced and the transmission accuracy is greatly improved.

Other objects, advantages, and novel features of the invention will become more apparent from the following detailed description when taken in conjunction with the accompanying drawings.

BRIEF DESCRIPTION OF THE DRAWINGS

FIG. 4 is a 2D matrix array rule of multiple pairs of 2D indexes of geo zones according to the present invention.

FIG. 7 is a schematic drawing showing the pairs of 2D indexes of 2D grids and their related reference points according to the present invention.

FIG. 8 is a schematic drawing showing the relationship of the current grid and the traveling grids.

DETAILED DESCRIPTION OF THE PREFERRED EMBODIMENTS

Figure 1:
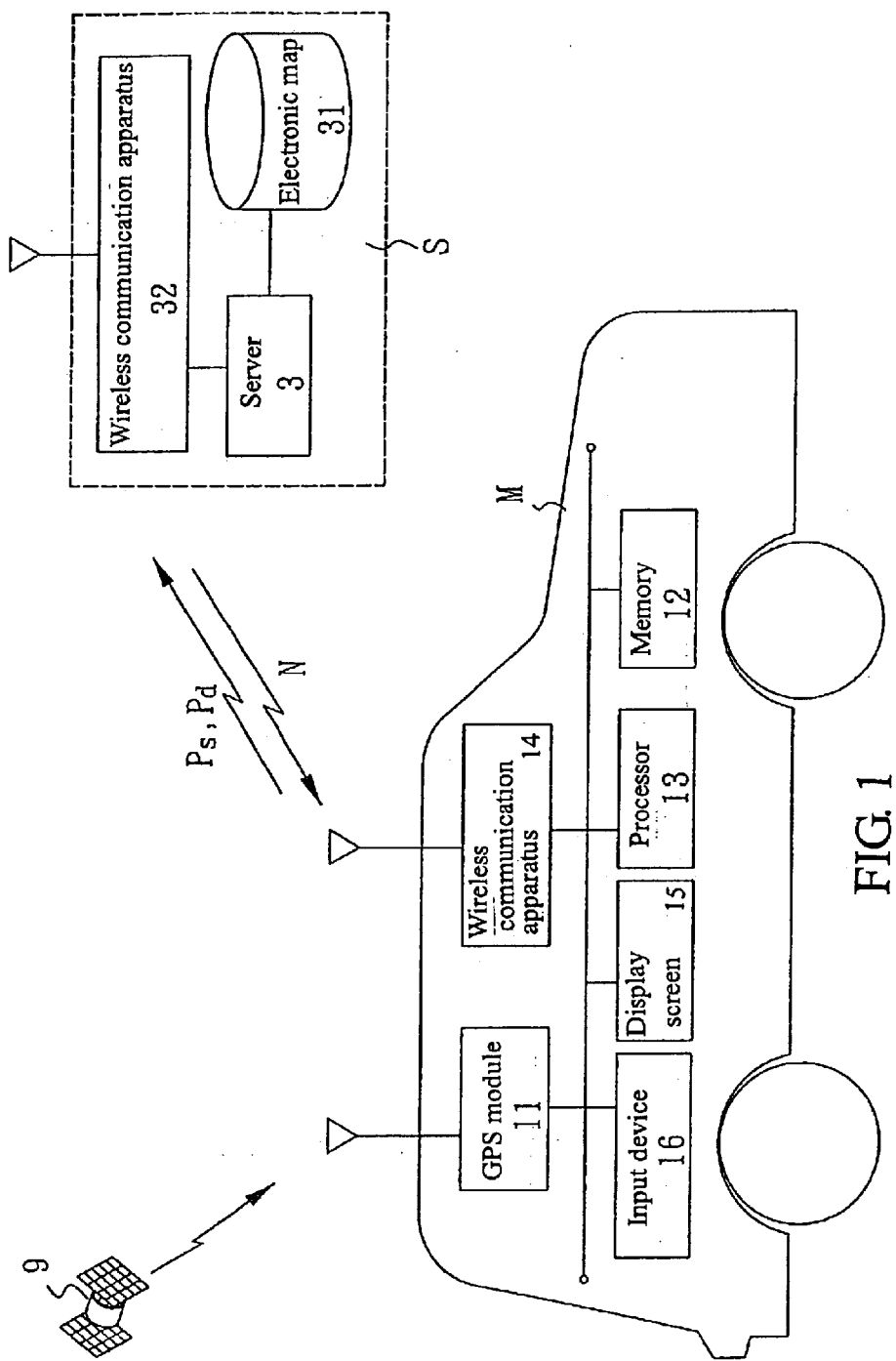
FIG. 1 is a system block diagram of the preferred embodiment of the present invention.

With reference to FIG. 1, a remote customer service center S is provided having installed therein a server 3. An electronic map database 31 and a wireless communication apparatus 32 are linked to the server 3.

Figure 2:
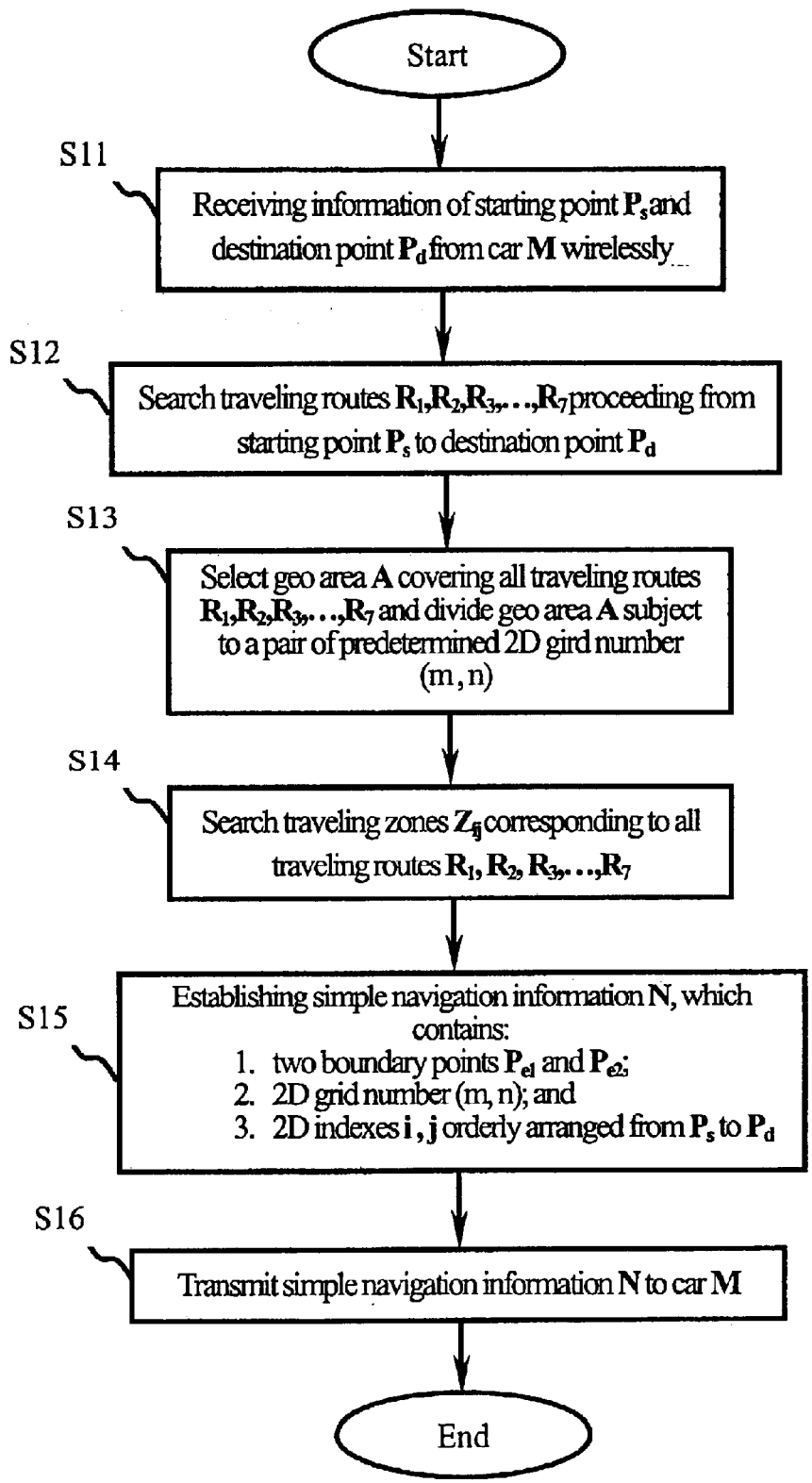
FIG. 2 is a flow chart explaining the operation of the remote customer service center according to the present invention.

Referring to FIG. 2 and FIG. 1 again, the customer service center S wirelessly receives a navigation request from a remote car M through the wireless communication apparatus 32. The navigation request includes starting point data $P_s$ and destination point data $P_d$ (Step S11). Normally, the starting point data $P_s$ is the current GPS coordinates $P_s$ ($X_s, Y_s$) the car M directly retrieved from the GPS module 11 of the car M. Alternatively, the car owner can use an input device 16 (keyboard, touch screen, voice recognizer, . . . etc.) to input the name of the street or the intersection manually. Normally, the destination point data $P_d$ is a speech sounds provided by the car owner to a serviceman of the customer service center S through the wireless communication apparatus 14, enabling the serviceman of the customer service center S to set the destination point coordinates $P_d(X_d,Y_d)$ for the car. Alternatively, the car owner can input the destination point coordinates $P_d$ ($X_d,Y_d$) with the aforesaid input device 16 manually.

Figure 3:
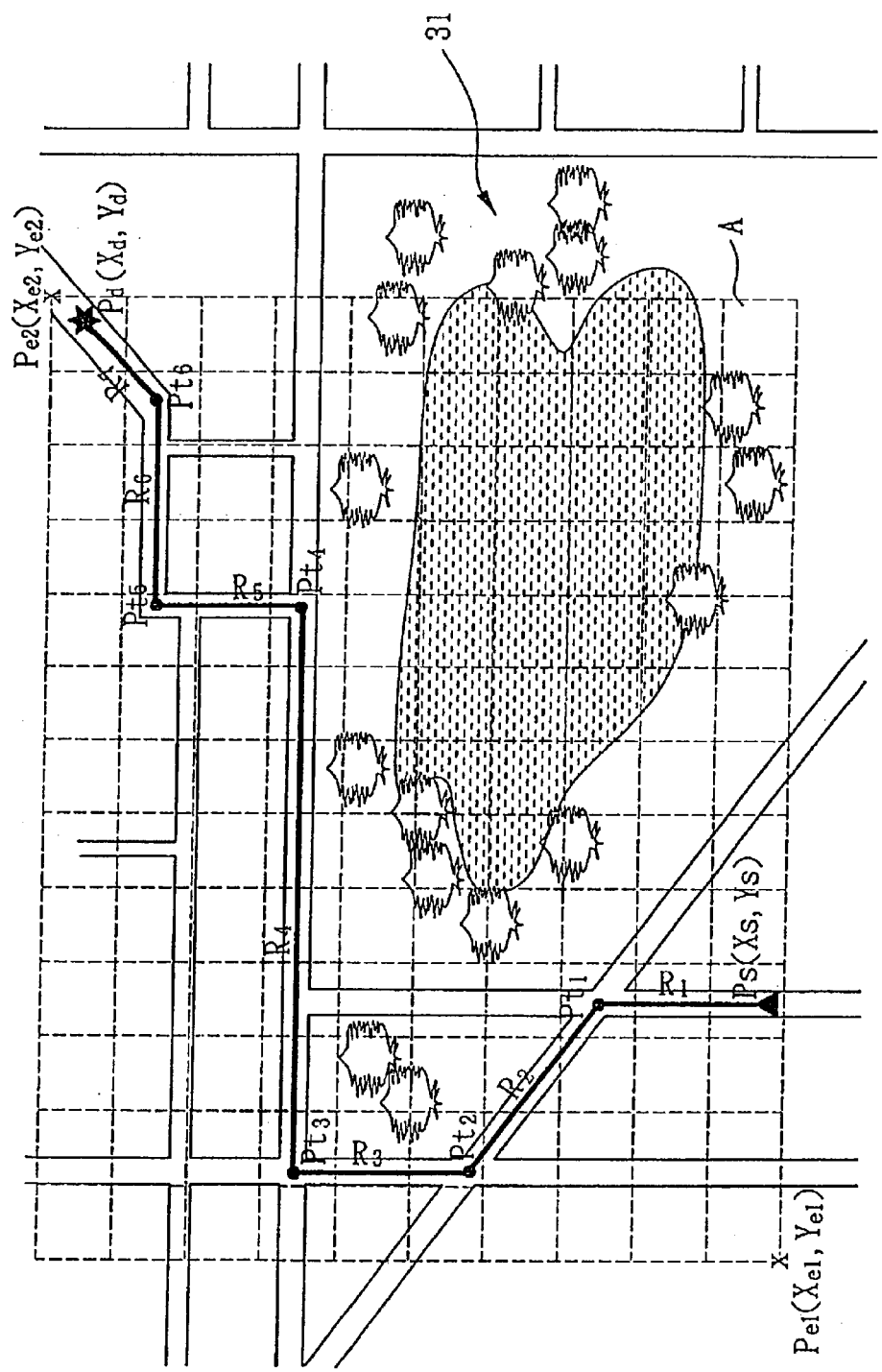
FIG. 3 is a schematic drawing showing an optimal traveling route according to the present invention.

Referring to FIG. 3 and FIGS. 1 and 2 again, the server of the customer service center S searches an optimal route with traveling routes $R_1, R_2, R_3 \ldots, R_7$ and the related turning points $P_{t1}, P_{t2}, P_{t3}, \ldots P_{t6}$ from the electronic map 31 based on the data of the starting point coordinates $P_s(X_s, Y_s)$ and the destination point coordinates $P_d(X_d,Y_d)$ (Step S12).

The server 3 selects from the electronic map 31 a geo area A covering the searched traveling routes $R_1, R_2, R_3 \ldots, R_7$ (Step S13). As shown in FIG. 3, in this embodiment, the geo area A is a rectangular area defined by the boundary points coordinates $P_{e1}(X_{e1},Y_{e1})$ and $P_{e2}(X_{e2},Y_{e2})$ of the lower left corner and upper right corner in the longitude/latitude plane coordinate system of the earth, such that X-coordinate of traveling routes $R_1, R_2, R_3 \ldots, R_7$ are between $X_{e1}$ and $X_{e2}$; Y-coordinate of traveling routes $R_1, R_2, R_3 \ldots, R_7$ are between $Y_{e1}$ and $Y_{e2}$. Preferably, the geo area A covers the starting point coordinates $P_s(X_s,Y_s)$.

Referring to FIG. 4 and FIG. 3 again, the server 3 equally divides the aforesaid geo area A into multiple geo zones $A_{ij}$ of m+1 columns and n+1 rows by a pair of predetermined 2D grid number (m,n), and defines a respective pair of 2D index i,j for every geo zone $A_{ij}$ subject to a 2D matrix array rule, in which i=0 . . . m, j=0 . . . n. The pair of predetermined 2D grid number (m,n) is a default value stored in the server 3. In order to improve wireless transmission efficiency and to match the continued hexadecimal operation, the pair of 2D grid number (m,n) is suggested to be 16×16 (i.e., $(FF)_H$ in hexadecimal). However, the server 3 may change the pair of 2D grid number (m,n) subject to actual requirements. For example, the server 3 has stored therein the equal side length of every geo zone $A_{ij}$, and divides the actual length and width of the geo area A by the fixed side length so as to obtain respective integral multiples for the pair of 2D grid number (m,n).

Figure 5:
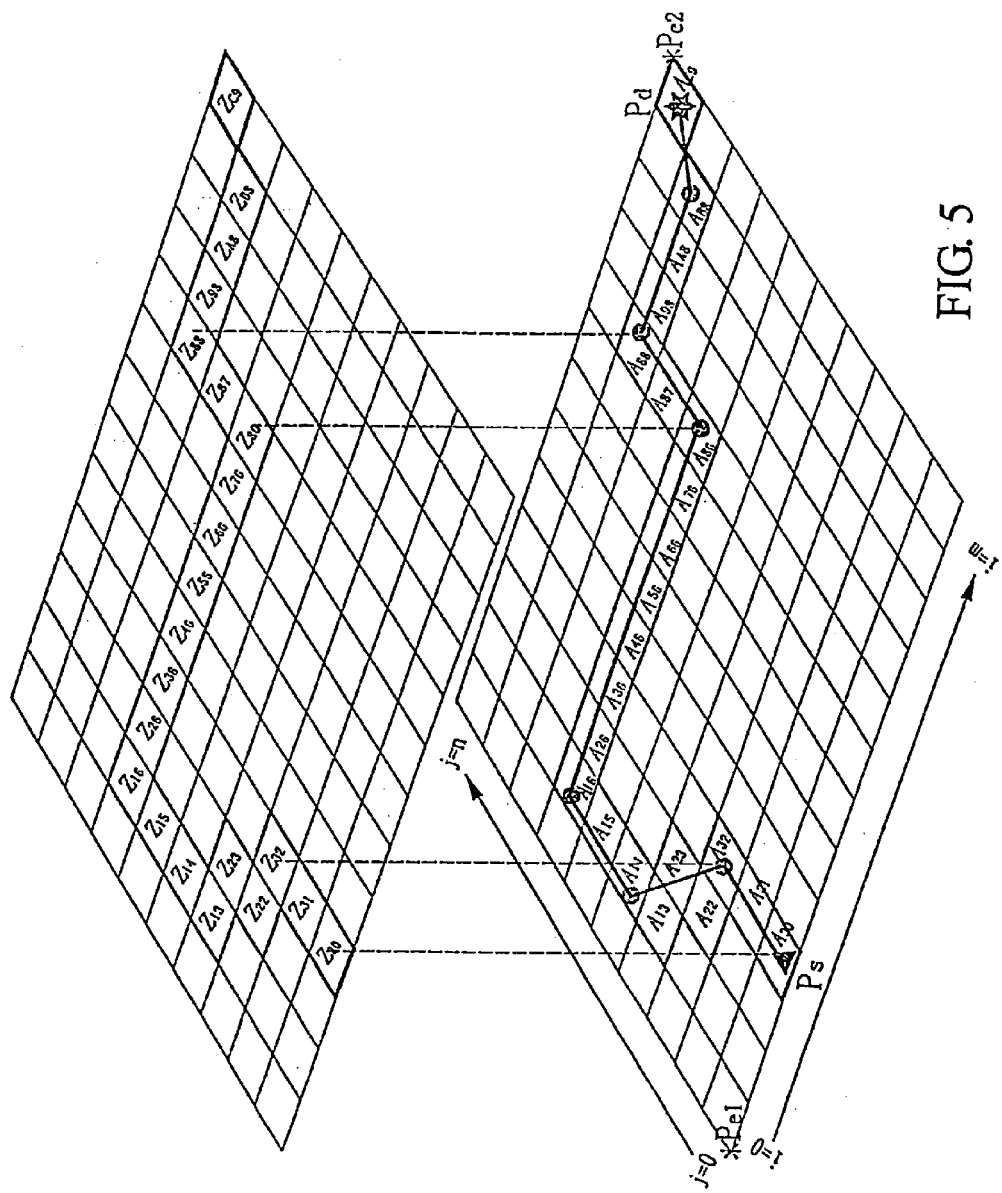
FIG. 5 is schematic drawing showing the traveling route corresponded to traveling zones according to the present invention.

FIG. 5 shows the server 3 compared the aforesaid traveling routes $R_1,R_2,R_3 \ldots, R_7$ to the geo zones $A_{ij}$ to find multiple traveling zones $Z_{ij}$ corresponding to the geo zones $A_{ij}$ which include the traveling routes $R_1,R_2,R_3 \ldots, R_7$ therein (Step S14).

Thereafter, the server 3 assembles the two boundary points coordinates $P_{e1}(X_{e1},Y_{e1})$ and $P_{e2}(X_{e2},Y_{e2})$, the pair of 2D grid number (m,n), and the orderly arranged pairs of 2D indexes i,j of the traveling zones $Z_{ij}$ into a simple navigation information N (Step S15). As illustrated in FIGS. 3~5, the simple navigation information N can be expressed by:

$N=\$\$(X_{e1},Y_{e1}),(X_{e2},Y_{e2}),(m,n),30,31,32,22,23,13,14,15,16,26,$
$36,46,56,66,76,86,87,88, 98,A8,B8,C9\$\$$

in which, the pairs of 2D indexes i,j of the traveling zones $Z_{ij}$ are arranged in proper order proceeding from the starting point $P_s$ to the destination point $P_d$. Alternatively, they can be arranged reversely.

The customer service center S immediately sends the aforesaid simple navigation information N with a short message to the wireless communication apparatus 14 of the remote car M by the wireless communication apparatus 32 (Step S16). According to the present preferred embodiment, the two wireless communication apparatus 31 and 14 each comprise a GPRS (General Packet Radio Service) module for mutual transmitting and receiving signal wirelessly. Alternatively, a GSM (Groupe Speciale Mobile) module, 3C module, pager, or any of a variety of equivalent wireless communication modules may be used.

Figure 6:
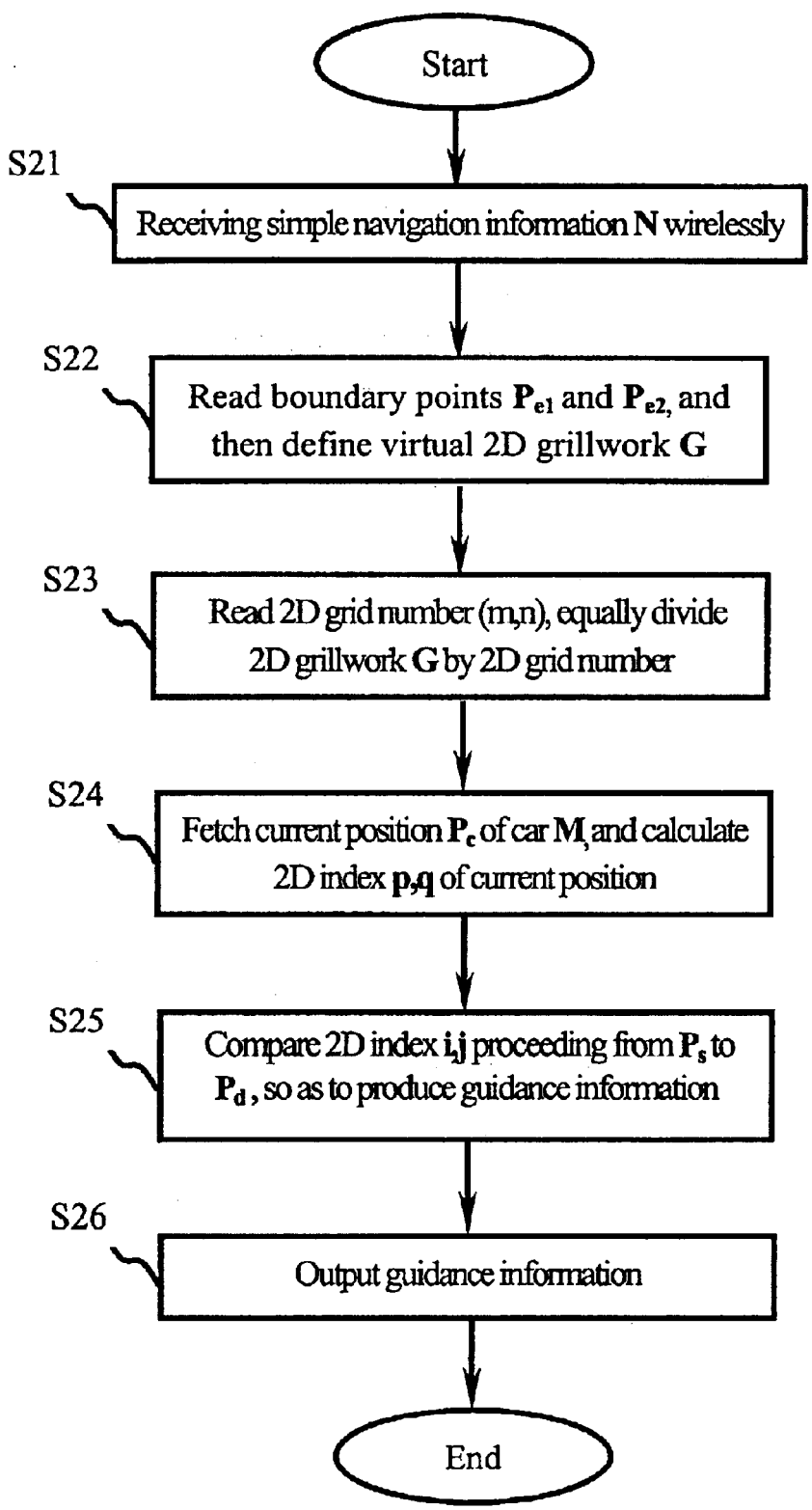
FIG. 6 is a flow chart explaining the operation of the On-Board Unit according to the present invention.

Referring to FIG. 6 and FIG. 1 again, when the wireless communication apparatus 14 of the car M received the aforesaid simple navigation information N (Step S21), the processor 13 of the car M immediately stores the information N in a memory 12 for ready use.

Figure 7:
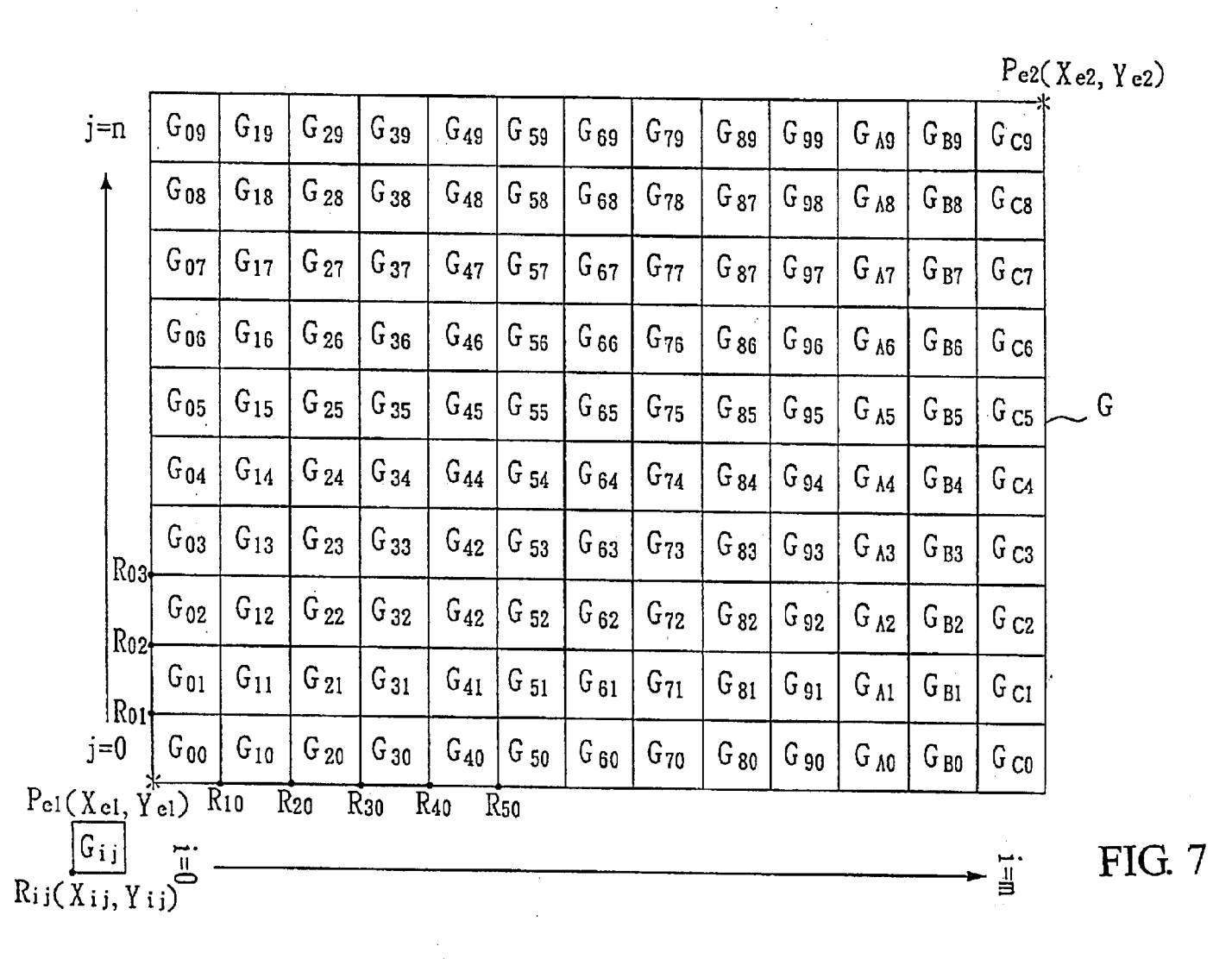

The processor 13 of the car M starts to read in the two boundary points coordinates $P_{e1}(X_{e1},Y_{e1})$ and $P_{e2}(X_{e2},Y_{e2})$ of the simple navigation information N from the memory 12, and then uses the two boundary points coordinates $P_{e1}(X_{e1},Y_{e1})$ and $P_{e2}(X_{e2},Y_{e2})$ as the lower left corner and upper right corner boundaries to make out and define a virtual 2D grillwork G as shown in FIG. 7 (Step S22). Physically, the 2D grillwork G is simulated and is corresponding to the actual geo district of the aforesaid geo area A.

FIG. 7 shows the processor 13 further fetched the pair of 2D grid number (m,n) of the aforesaid simple navigation information N from the memory 12, and equally divided the 2D grillwork G into multiple 2D grids $G_{ij}$ (Step S23) into m+1 columns and n+1 rows. The 2D grids $G_{ij}$ are respectively defined by a respective pair of 2D index i,j subject to the same 2D matrix array rule. The lower left corner of every 2D grid $G_{ij}$ is designated as the reference position $R_{ij}$ ($X_{ij},Y_{ij}$), i=0 . . . m, j=0 . . . n, in which:

$$X_{ij} = X_{e1} + i\frac{(X_{e2} - X_{e1})}{m+1} \text{ and } Y_{ij} = Y_{e1} + j\frac{(Y_{e2} - Y_{e1})}{n+1}.$$

Physically, every 2D grid $G_{ij}$ is simulated and is corresponding to the actual geo district of one of the aforesaid geo zones $A_{ij}$.

When traveling, the processor 13 fetches the current position coordinates $P_c(X_c,Y_c)$ of the car M from the GPS module 11 anytime, and compares fetched data to the reference point positions $R_{ij}(X_{ij},Y_{ij})$, so as to calculate the pair of 2D index p,q of a current grid $C_{pg}$ corresponding to the current position $P_c(X_c,Y_c)$ of the car M. According to this example, presume $X_c$ is between $X_{ij}$ and $X_{(i+1)j}$, i.e., $X_{ij} \leq X_c < X_{(i+1)j}$, therefore when replacing $X_{ij}$ with $$X_{ij} = X_{e1} + i\frac{(X_{e2} - X_{e1})}{m+1}$$

into the equation, then $$X_{e1} + i\frac{(X_{e2} - X_{e1})}{m+1} \leq X_c < X_{e1} + (i+1)\frac{(X_{e2} - X_{e1})}{m+1},$$

when adjusted, $$i \leq (m+1)\frac{(Xc - X_{e1})}{(X_{e2} - X_{e1})} < (i+1),$$

therefore $$p = \left\lceil (m+1)\frac{(Xc - X_{e1})}{(X_{e2} - X_{e1})} \right\rceil,$$

which means taking the integral number part as to the 2D index P.

In the same manner, the other 2D index q is obtained from the integral number part of $$q = \left\lceil (n+1)\frac{(Yc - Y_{e1})}{(Y_{e2} - Y_{e1})} \right\rceil.$$

Figure 8:
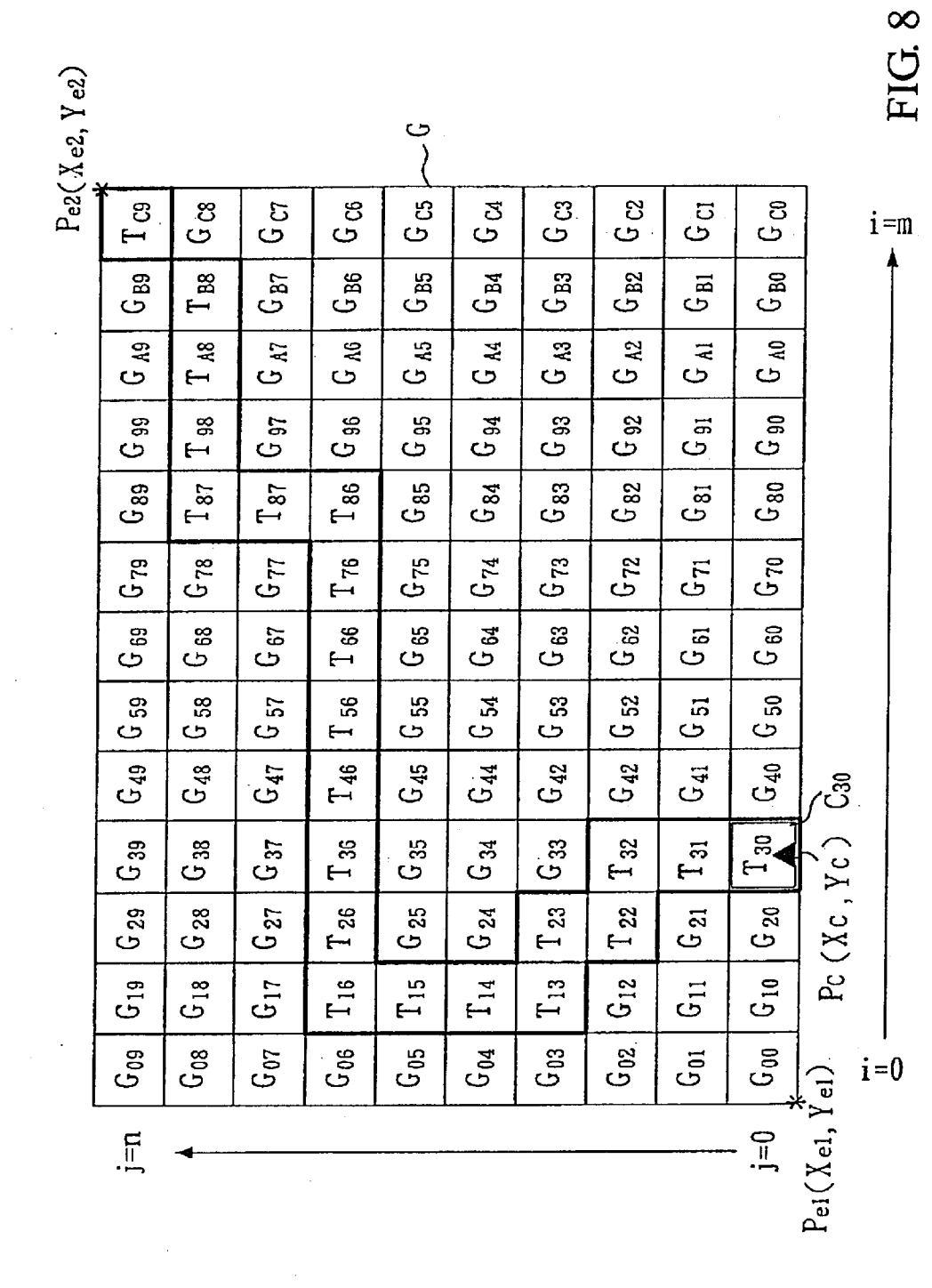

Based on the example shown in FIG. 8, presume the car M is departing from the starting point $P_s = P_c(X_c,Y_c)$. Therefore, the corresponding current grid is $C_{30}$, and its pair of 2D index are p=3, and q=0 (hereinafter, the pair of 2D index is expressed by (p,q)=(3,0)). FIG. 8 also shows the orderly arranged traveling grids $T_{ij}$ proceeding from the starting point $P_s$ to the destination $P_d$ to which the pairs of 2D indexes i,j in the memory 12 correspond.

The processor 13 compares the pair of 2D index (3,0) of the current grid $C_{30}$ to the pairs of 2D indexes i,j of the traveling grids $T_{ij}$, so as to produce a guidance information D (Step S25), and then uses an output device (for example, a display 15) to show the guidance information D (Step S26) for guiding the car owner to approach the destination $P_d$.

Figure 9:
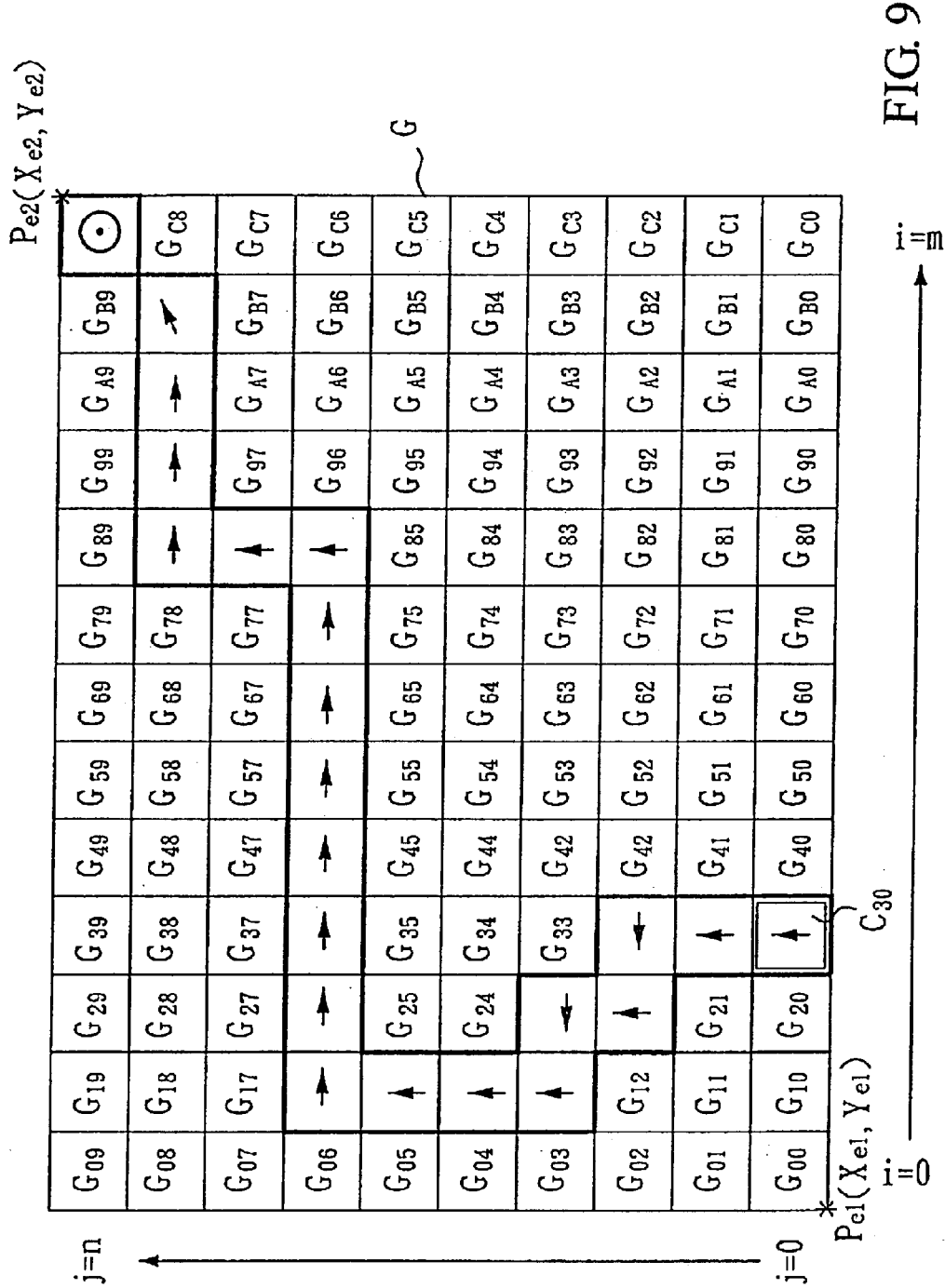
FIG. 9 is a schematic drawing showing the arrowhead signs in the traveling grids from the current grid to the destination according to the present invention.

When the processor 13 compared the pair of 2D index (3,0) of the current grid $C_{30}$ to be matched with the pair of 2D index (3,0) of one traveling grid $T_{30}$ in the memory 12, the processor 13 then reads in the next pair of 2D index (3,1) of the next traveling grid $T_{31}$, and then calculates the relationship of the next travel grid $T_{31}$ relative to the current grid $C_{30}$ to be in the direction of j=+1 (one grid plus in longitude direction). Therefore, an arrowhead sign (↑) aiming at the next traveling grid $T_{31}$ is generated as the guidance information D (see FIG. 9) and shown on the display screen 15. FIG. 9 also shows different eight-direction arrowhead signs to be seen when in each traveling grid $T_{ij}$ for guiding the car M in proper order to approach the last traveling grid $T_{c9}$ at the destination $P_d$. Alternatively, the aforesaid guidance information D can be provided in a voice response to ensure a safety driving.

Figure 10:
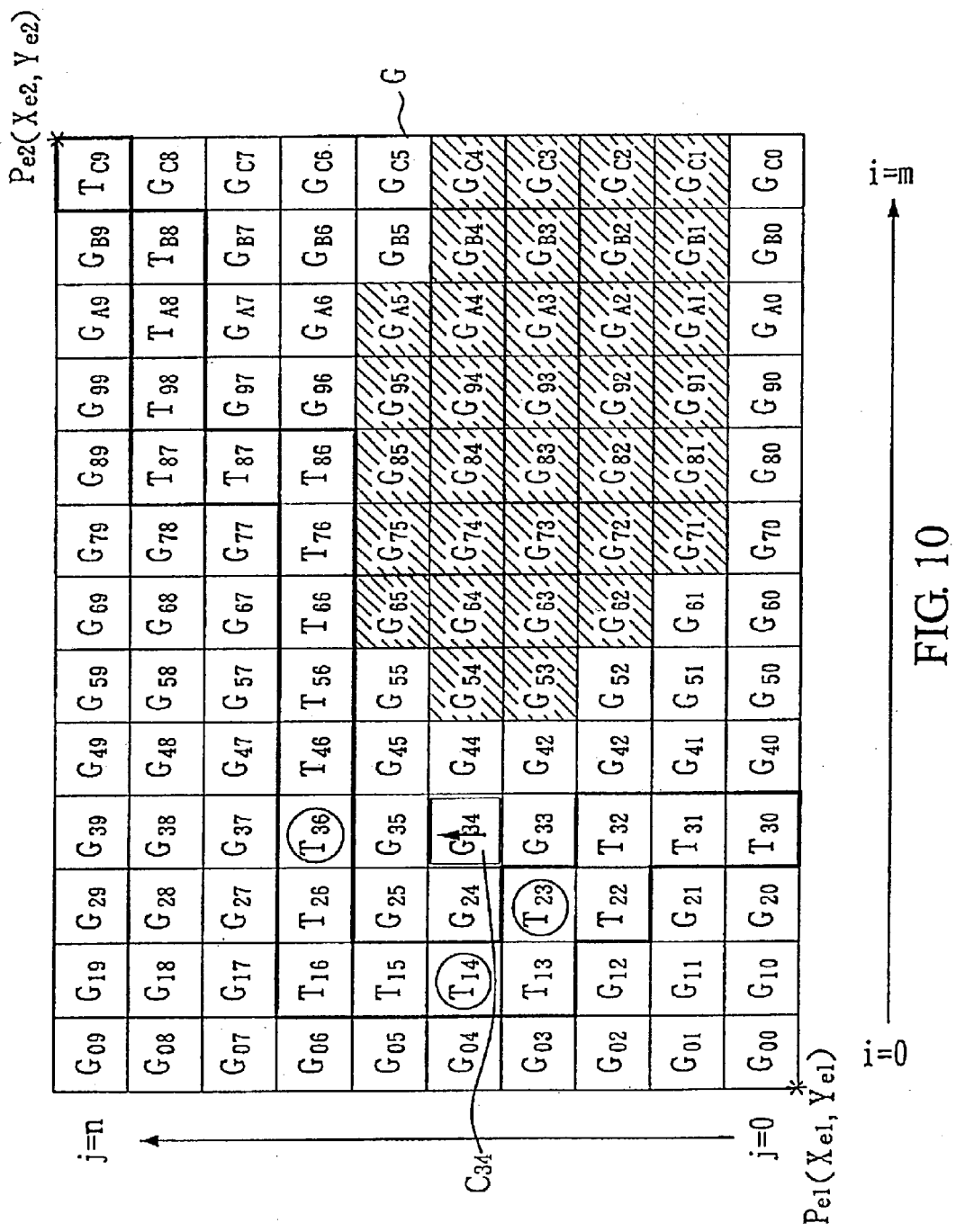
FIG. 10 is a schematic drawing showing the relationship of another current grid and the traveling grids according to the present invention.

Referring to FIG. 10, when the car M lost his way from $T_{32}$ to the 2D grid $G_{34}$, the processor 13 compares the pair of 2D index (3,4) of the current grid $C_{pq}$ (i.e., $C_{34}$) to be not in match with any pairs of 2D index i,j of either traveling grid $T_{ij}$ in the memory 12. Immediately thereafter, the processor 13 calculates the difference value $\Delta_{ij}=|i-p|+|j-q|$ between the current grid $C_{pq}$ (i.e., $C_{34}$) and the rest traveling grids $T_{ij}$, in which $|i-p|$ and $|j-q|$ are the respective absolute values. The processor 13 selects and assigns the traveling grid $T_{36}$, which has the smallest $\Delta_{ij}$ and is closest to the traveling grid $T_{c9}$ of the destination $P_d$, to be the next target grid.

For example, FIG. 10 shows the rest traveling grids $T_{22}$, $T_{23}$, $T_{13}$, $T_{14}$, $T_{15}$, $T_{16}$, $T_{26}$, $T_{36}$, $T_{46}$ ... left behind $T_{32}$ to be traveled, in which, (1) the difference value between the traveling grid $T_{23}$ and the current grid $C_{34}$ is: $\Delta_{23}=|2-3|+|3-4|=1+1=2$, (2) the difference value between the traveling grid $T_{14}$ and the current grid $C_{34}$ is: $\Delta_{14}=|1-3|+|4-4|=2+0=2$, and (3) the difference value between the traveling grid $T_{36}$ and the current grid $C_{34}$ is: $\Delta_{36}=|3-3|+|6-4|=0+2=2$ show the smallest $\Delta_{ij}$, and the order of the traveling grid $T_{36}$ is the one closest to $T_{c9}$. Therefore, the processor 13 selects and assigns the traveling grid $T_{36}$ to be the next target grid in priority, and then compares it to the current grid $C_{34}$, so as to obtain the relationship of the next target grid $T_{36}$ relative to the current grid $C_{34}$ in the direction of j=+2 (longitude plus 2 grids). Therefore, an arrowhead sign (↑) aiming at the next traveling grid $T_{36}$ is generated as the guidance information D (see FIG. 10) and shown on the display screen 15.

According to the present preferred embodiment, the comparison between the pair of 2D index i,j of every traveling grid $T_{ij}$ and the pair of p,q of current grid $C_{pq}$ by the processor 13 of the On-Board Unit is a simple 2-digit hexadecimal comparison that can easily be processed. Therefore, the invention greatly improves the navigation calculation efficiency. Because the invention eliminates the complicated procedure of converting and comparing longitude/latitude coordinates data, a simple and inexpensive processor is sufficient to achieve the calculating job. Further, the customer service center S needs only to transmit the simple 2-digit hexadecimal 2D index i,j of every traveling zone $Z_{ij}$ to the car M wirelessly. Because the invention needs not to convert and transmit huge longitude/latitude coordinates data to the car M, wireless data transmission amount is reduced and transmission accuracy is greatly improved.

In order to match positioning signal transmitted from a conventional global positioning satellite 9, every procedure of the present embodiment is designed subject to geographical longitude/latitude plane coordinates system of the earth. Alternatively, other rectangular plane coordinate system, mitered plane coordinate system, or radius-angle (Rθ) coordinate system may be used as a substitute under the condition that the remote customer service center S and the car M use the same coordinate system.

The boundary points of the simple navigation information N are not limited to the aforesaid example. For example, it is workable to select the upper left corner and the lower right corner, three of the four corners, or the four corners for making the boundary points of the simple navigation information N.

The pair of 2D index i,j of every 2D grid $G_{ij}$ and every geo zone $A_{ij}$ can be indexed subject to other type of 2D array rule instead of the above 2D matrix array rule. Instead of the first pair of 2D index (0,0) shown in the lower left grid in FIG.

4, any other grid can be designated as the first grid and then the pair of 2D index each is increased progressively (or reduced progressively). The progressively increased amount (or progressively reduced amount) can be 2,3,4 . . . etc. Further, any other initial value can be used for the first pair of 2D index instead of (0,0).

The remote server 3 may preferably search from the electronic map 31 rivers, lakes (for example, the lake area shown in FIG. 3 and the corresponding slash barrier area shown in FIG. 10), mountains, crags, and other natural barrier areas or dangerous areas, or traffic jam segments, and then transmits the related 2D index (i,j) of the barrier area with the simple navigation information N to the car M wirelessly, informing the driver of the car M to move away from these barrier areas. This measure is very practical for the car M that does not have a precision navigation apparatus on board and relies upon the navigation guidance provided by the remote server. It prevents the car M from entering a dangerous way, and dispels driving scotoma.

Actually, every operation step of the customer service center S can be achieved manually by a serviceman without through the automatic server.

Although the present invention has been explained in relation to its preferred embodiments, it is to be understood that many other possible modifications and variations can be made without departing from the spirit and scope of the invention as hereinafter claimed.

What is claimed is:

1. A simple navigation method used in a customer service center comprising the steps in series of:
   (A) receiving position information of a starting point and position information of a destination point;
   (B) searching at least one traveling route proceeding from said starting point to said destination point;
   (C) selecting a geo area covering said at least one traveling route, in which said geo area is defined by at least two position parameters and equally divided into a plurality of geo zones subject to a pair of predetermined 2D (two-dimensional) grid numbers, said geo zones being respectively defined with a respective pair of 2D (two-dimensional) indexes subject to a 2D (two-dimensional) array rule;
   (D) searching multiple traveling zones corresponding to the geo zones including said at least one traveling route therein; and
   (E) establishing a simple navigation information, said simple navigation information comprising said at least two position parameters, said pair of 2D grid numbers, and the pairs of 2D indexes of said traveling zones being arranged in order.

2. The simple navigation method as claimed in claim 1, wherein said at least two position parameters are the position coordinates of at least two boundary points in a rectangular plane coordinate system; said geo area is defined by the position coordinates of said at least two boundary points and equally divided into said geo zones by said pair of 2D grid numbers subject to said rectangular plane coordinate system.

3. The simple navigation method as claimed in claim 2, wherein said rectangular plane coordinate system is the longitude/latitude plane coordinate system of the earth.

4. The simple navigation method as claimed in claim 1, wherein the pairs of 2D indexes of said geo zones during step (c) are defined subject to a 2D matrix array rule.

5. The simple navigation method as claimed in claim 1, wherein the pairs of 2D indexes of said traveling zones of said simple navigation information during step (E) are arranged in order from said starting point to said destination point.

6. The simple navigation method as claimed in claim 1, wherein The simple navigation method as claimed in claim 1 further comprising the step (F): transmitting said simple navigation information to a motor vehicle.

7. The simple navigation method as claimed in claim 1, wherein said customer service center comprises a server linked to an electronic map database.

8. The simple navigation method as claimed in claim 1, wherein said customer service center further comprises a wireless communication apparatus adapted to send information to an receive information from a motor vehicle wirelessly.

9. The simple navigation method as claimed in claim 8, wherein said wireless communication apparatus is a GPRS (General Packet Radio Service) module.

10. A simple navigation system installed in a motor vehicle, comprising:
    a GPS (global positioning system) module adapted to calculate information of a current position of said motor vehicle;
    memory means, said memory means having stored therein a simple navigation information comprising at least two position parameters, a pair of predetermined 2D (two-dimensional) grid numbers, and multiple pairs of 2D (two-dimensional) indexes arranged in order;
    processor means adapted to read said at least two position parameters from said memory means and to define a virtual 2D (two-dimensional) grillwork by means of said at least two position parameters, to read said pair of 2D grid numbers from said memory means and to equally divide said 2D grillwork into a plurality of 2D (two-dimensional) grid numbers from said memory means and to equally divide said 2D grillwork into a plurality of 2D (two-dimensional) grids each having a respective reference point position and a respective pair of 2D indexes defined subject to a 2D array rule, to fetch the information of the current position of said motor vehicle from said GPS module and to compare the information of the current position of said motor vehicle to the reference point positions of said 2D grids so as to calculate the pair of 2D indexes of a current grid corresponding to the current position of said motor vehicle, and to produce a guidance information by comparing the pair of 2D indexes of the current grid of the current position of said motor vehicle to the pairs of 2D indexes of multiple traveling grids stored in said memory means, said traveling grids corresponding to the 2D grids including at least one traveling route proceeding from a starting point to a destination point; and
    output means adapted to output said guidance information.

11. The simple navigation system as claimed in claim 10, wherein said pairs of 2D indexes of said simple navigation information are arranged subject to the order of said traveling grids from said starting point to said destination point.

12. The simple navigation system as claimed in claim 10, wherein said pairs of 2D indexes of said 2D grids are defined subject to a 2D matrix array rule.

13. The simple navigation system as claimed in claim 10, wherein said at least two position parameters are the position coordinates of at least two boundary points in a rectangular plane coordinate system; said processor means uses the position coordinates of said at least two boundary points to define said 2D grillwork, and equally divide said 2D grillwork into said 2D grids by said pair of 2d grid numbers subject to said rectangular plate coordinate system.

14. The simple navigation system as claimed in claim 13, wherein said rectangular plane coordinate system is the longitude/latitude plane coordinate system of the earth.

15. The simple navigation system as claimed in claim 13, wherein the position coordinates of said at least two boundary points include $P_{e1}(X_{e1}, Y_{e1})$ and $P_{e2}(X_{e2}, Y_{e2})$ respectively defined as the lower left corner and upper right corner of said 2D grillwork, and the coordinates $R_{ij}(X_{ij}, Y_{ij})$, i=0 ... m, j=0 ... n of the reference point positions of said 2D grids defining the lower left corner of the respective 2D grids and having the relationship of:

$$X_{ij} = X_{e1} + i\frac{(X_{e2} - X_{e1})}{m+1} \text{ and } Y_{ij} = Y_{e1} + j\frac{(Y_{e2} - Y_{e1})}{n+1},$$

and said processor means calculates the pair of 2D indexes p,q of the current grid $C_{p,q}$ corresponding to the current position coordinates $P_c(X_c, X_e)$ of said motor vehicle subject to the equations of $$p = \left[(m+1)\frac{(Xc - X_{e1})}{(X_{e2} - X_{e1})}\right],$$

and $$q = \left[(n+1)\frac{(Yc - Y_{e1})}{(Y_{e2} - Y_{e1})}\right].$$

16. The simple navigation system as claimed in claim 13, wherein when the pair of 2D indexes of the current grid match with one pair of 2D indexes stored in said memory means, said processor means reads in a next pair of 2D indexes from said memory means and compares the next pair of 2D indexes with the pair of 2D indexes of the current grid, so as to produce an arrowhead sign aiming from the current grid at a next traveling grid corresponding to the next pair of 2D indexes as the guidance information.

17. The simple navigation system as claimed in claim 13, wherein when the pair of 2D indexes p,q of the current grid $C_{p,q}$ do not match with any pair of 2D indexes stored in said memory means, said processor means selects one pair of 2D indexes i,j of a remainder of the traveling grids $T_{ij}$ having a minimum difference value $\Delta_{ij} = |i-p| + |j-p|$, and then assigns a corresponding grid to be a next target grid, and then compares the pair of 2D indexes of the next target grid with the pair of 2D indexes p,q of the current grid $C_{p,q}$, so as to produce an arrowhead sign aiming from the current grid $C_{p,q}$ at the next target grid as the guidance information.

18. The simple navigation system as claimed in claim 17, wherein said processor means selects the remainder of the traveling grids of which the pair of 2D indexes has the minimum difference value further subject to a priority belonging to an order relatively closer to said destination point.

19. The simple navigation system as claimed in claim 10, further comprising a wireless communication apparatus adapted to transmit information to and receive information from a remote customer service center wirelessly.

20. The simple navigation system as claimed in claim 19, wherein said wireless communication apparatus is a GPRs (General Packet Radio Service) module.

* * * * *